United States Patent
Kurian (10) Patent No.: US 11,188,671 B2
(45) Date of Patent: Nov. 30, 2021

(54) DISTRIBUTED DATA CHAMBER SYSTEM

(71) Applicant: Bank of America Corporation, Charlotte, NC (US)

(72) Inventor: Manu Kurian, Dallas, TX (US)

(73) Assignee: Bank of America Corporation, Charlotte, NC (US)

( * ) Notice: Subject to any disclaimer, the term of this patent is extended or adjusted under 35 U.S.C. 154(b) by 276 days.

(21) Appl. No.: 16/381,197

(22) Filed: Apr. 11, 2019

(65) Prior Publication Data

US 2020/0327247 A1   Oct. 15, 2020

(51) Int. Cl.
| | | |
|---|---|---|
| G06F 16/00 | (2019.01) |
| G06F 21/62 | (2013.01) |
| G06F 21/54 | (2013.01) |
| G06F 16/2452 | (2019.01) |
| G06F 16/2458 | (2019.01) |
| G06F 21/53 | (2013.01) |

(52) U.S. Cl.
CPC ...... *G06F 21/6227* (2013.01); *G06F 16/2452* (2019.01); *G06F 16/2471* (2019.01); *G06F 21/53* (2013.01); *G06F 21/54* (2013.01)

(58) Field of Classification Search
CPC ............. G06F 16/2452; G06F 21/6218; G06F 21/6227; G06F 21/53; G06F 21/54; G06F 16/2471
See application file for complete search history.

(56) References Cited

U.S. PATENT DOCUMENTS

| | | | |
|---|---|---|---|
| 7,103,589 B1* | 9/2006 | Kepler | G06F 16/2471 707/706 |
| 10,685,047 B1* | 6/2020 | Patnaik | G06F 16/3325 |
| 2010/0094862 A1* | 4/2010 | Bent | G06F 16/2471 707/716 |
| 2010/0094892 A1* | 4/2010 | Bent | G06F 16/2471 707/760 |
| 2011/0047171 A1* | 2/2011 | Paparizos | G06F 16/252 707/760 |
| 2014/0278754 A1* | 9/2014 | Cronin | G06F 16/24578 705/7.29 |
| 2016/0224532 A1* | 8/2016 | Miller | G06F 16/22 |

(Continued)

*Primary Examiner* — Shiow-Jy Fan
(74) *Attorney, Agent, or Firm* — Banner & Witcoff, Ltd.; Michael A. Springs (57) ABSTRACT

Aspects of the disclosure relate to processing systems for performing distributed data storage and query processing. A computing platform may receive a query requesting source data collection and may route the query to logical sub-chamber objects. At each of the logical sub-chamber objects, the computing platform may identify a portion of the source data collection maintained by the corresponding logical sub-chamber object and may modify the query to produce a modified query that requests source data corresponding to an unsatisfied portion of the request. The computing platform may route, to additional logical sub-chamber objects, the modified query and the identified source data collection. The computing platform may determine that the request associated with the source data collection has been satisfied in its entirety and may assemble a dataset corresponding to the source data collection in its entirety. The computing platform may send the dataset corresponding to the source data collection.

20 Claims, 9 Drawing Sheets

(56) References Cited

U.S. PATENT DOCUMENTS

| | | | |
|---|---|---|---|
| 2016/0292221 A1* | 10/2016 | Clarke | G06F 21/6227 |
| 2017/0161327 A1* | 6/2017 | Lu | G06F 16/256 |
| 2018/0225353 A1* | 8/2018 | Li | G06F 16/2272 |
| 2019/0102408 A1* | 4/2019 | Loaiza | G06F 16/2282 |
| 2019/0179301 A1 | 6/2019 | Celia et al. | |
| 2019/0180291 A1 | 6/2019 | Schmeling et al. | |
| 2019/0180499 A1 | 6/2019 | Caulfield et al. | |
| 2019/0182101 A1 | 6/2019 | Kulshreshtha et al. | |
| 2019/0182289 A1 | 6/2019 | White | |
| 2019/0182558 A1 | 6/2019 | Stern | |
| 2019/0182678 A1 | 6/2019 | Kikinis et al. | |
| 2019/0187680 A1 | 6/2019 | Celia et al. | |
| 2019/0187681 A1 | 6/2019 | Celia et al. | |
| 2019/0187682 A1 | 6/2019 | Celia et al. | |
| 2019/0187683 A1 | 6/2019 | Celia et al. | |
| 2019/0187684 A1 | 6/2019 | Celia et al. | |
| 2019/0187685 A1 | 6/2019 | Celia et al. | |
| 2019/0187686 A1 | 6/2019 | Celia et al. | |
| 2019/0187687 A1 | 6/2019 | Celia et al. | |
| 2019/0187688 A1 | 6/2019 | Celia et al. | |
| 2019/0187689 A1 | 6/2019 | Celia et al. | |
| 2019/0187690 A1 | 6/2019 | Celia et al. | |
| 2019/0188088 A1 | 6/2019 | Muller et al. | |
| 2019/0188190 A1 | 6/2019 | Kulesza et al. | |
| 2019/0188406 A1* | 6/2019 | McKelvie | G06F 21/6218 |
| 2019/0188959 A1 | 6/2019 | Lutnick et al. | |
| 2019/0196916 A1 | 6/2019 | Kumarasamy et al. | |
| 2019/0197018 A1 | 6/2019 | Evans et al. | |
| 2019/0197021 A1 | 6/2019 | Bowman et al. | |
| 2019/0197248 A1 | 6/2019 | O'Hare et al. | |
| 2019/0197877 A1 | 6/2019 | Baum et al. | |
| 2019/0197879 A1 | 6/2019 | Raji et al. | |
| 2019/0197880 A1 | 6/2019 | Raji et al. | |
| 2019/0199693 A1 | 6/2019 | Vityaz | |
| 2019/0199824 A1 | 6/2019 | Shribman et al. | |
| 2019/0200977 A1 | 7/2019 | Shelton, IV et al. | |
| 2019/0201136 A1 | 7/2019 | Shelton, IV et al. | |
| 2019/0205088 A1 | 7/2019 | Dion et al. | |
| 2019/0205244 A1 | 7/2019 | Smith | |
| 2019/0205290 A1 | 7/2019 | Vijayan et al. | |
| 2019/0205911 A1 | 7/2019 | Wang | |
| 2019/0206562 A1 | 7/2019 | Shelton, IV et al. | |
| 2019/0206565 A1 | 7/2019 | Shelton, IV | |
| 2019/0206569 A1 | 7/2019 | Shelton, IV et al. | |
| 2019/0207853 A1 | 7/2019 | Ferriter et al. | |
| 2019/0207891 A1 | 7/2019 | Sedan | |
| 2019/0207976 A1 | 7/2019 | Yadav et al. | |
| 2019/0208034 A1 | 7/2019 | Shribman et al. | |
| 2019/0208035 A1 | 7/2019 | Shribman et al. | |
| 2019/0208036 A1 | 7/2019 | Shribman et al. | |
| 2019/0213044 A1 | 7/2019 | Cui et al. | |
| 2019/0213087 A1 | 7/2019 | Kumarasamy et al. | |
| 2019/0213104 A1 | 7/2019 | Qadri et al. | |
| 2019/0213179 A1 | 7/2019 | McHugh et al. | |
| 2020/0050612 A1* | 2/2020 | Bhattacharjee | G06F 16/283 |

* cited by examiner

DISTRIBUTED DATA CHAMBER SYSTEM

BACKGROUND

Aspects of the disclosure relate to distributed data storage systems and enhanced query processing systems. In particular, one or more aspects of the disclosure relate to computing platforms that maintain logical sub-chamber objects for data storage.

In many cases, enterprises and organizations may use a centralized database or table to maintain data for query processing. In some instances, however, such a centralized database or table may be vulnerable to an attack, which if successful, may infect and or cause a breach of the data in its entirety. Thus, it may be difficult to maintain data security using such implementations.

SUMMARY

Aspects of the disclosure provide effective, efficient, scalable, and convenient technical solutions that address and overcome the technical problems associated with distributed data storage and query processing. For example, some aspects of the disclosure provide techniques that may enable computing devices to maintain various chambers and sub-chamber objects that are each configured to identify different portions of a requested dataset. In doing so, data may be spread across various components on a network so as to decrease the risk of unauthorized access to, a breach of, or a malware infection of an entire dataset. Accordingly, the systems and methods described herein may overcome challenges associated with network data security.

In accordance with one or more embodiments of the disclosure, a computing device comprising at least one processor, a communication interface, and memory storing computer-readable instructions may receive a query comprising a request for a source data collection. The computing platform may route the query to one or more logical sub-chamber objects, where each of the one or more logical sub-chamber objects stores a subset of the source data collection. At each of the logical sub-chamber objects and in response to the query, the computing platform may identify a portion of the source data collection maintained by the corresponding logical sub-chamber object. At each of the logical sub-chamber objects, the computing platform may modify the query to produce a modified query that requests source data corresponding to an unsatisfied portion of the request. The computing platform may route, to one or more additional logical sub-chamber objects, the modified query and the identified source data collection until the modified query and the identified source data collection reach a loader object maintained at the computing platform. In one or more instances, each of the one or more additional logical sub-chamber objects may identify their respective subsets of the source data and modify the modified query to reflect the identification of the respective subsets of the source data. In one or more instances, the computing platform may determine, using the loader object, that the request associated with the source data collection has been satisfied in its entirety. The computing platform may use the loader object to assemble a dataset corresponding to the source data collection in its entirety. In response to the query, the computing platform may send the dataset corresponding to the source data collection.

In one or more instances, the computing platform may modify the query to produce the modified query by deleting, from the query, a satisfied portion of the request. In one or more instances, the computing device may determine that an error occurred during identification of the portion of the source data collection maintained by the corresponding logical sub-chamber objects. Based on the error, the computing platform may determine that the query should not be routed to further logical sub-chamber objects.

In one or more instances, the computing platform may authenticate, prior to routing the query to the one or more logical sub-chamber objects, the query. In one or more instances, a different version of the query may be received at each of a plurality of receiver channel objects maintained by the computing platform.

In one or more instances, a path of the query through the logical sub-chamber objects may be unknown to the receiver channel objects. In one or more instances, in response to determining that the query is not satisfied, the computing platform may route the modified query to an additional computing platform, which may be configured to identify a remainder of the source data collection. In one or more instances, the query may be translated into a format readable by the computing platform.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. In some instances, other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As a brief introduction to the concepts described further herein, one or more aspects of the disclosure relate to data storage in a distributed network that allows independent verification of a user and a connection. After an initial handshake, data objects may be dynamically built and sent through different chambers to perform dynamic cross data verification.

Data may be split into various components and spread across a network. This may prevent storage of all meaningful data at a single location. In some instances, this data distribution may occur at the file level, directory level, packet level, or the like.

Each chamber may add certain components to the data object to build a requested dataset. Similarly, each chamber may remove data elements that may compromise the data store or that may be vulnerable to misuse or attack.

In some instances, one or more chambers may contain sub-chambers which might not be able to read data from other chambers, but which may determine and/or control actions performed by the other chambers. This chamber-based control scheme may prevent compromised sub-chambers from identifying true data objects or contaminating the data contents to be included in a final data object and/or dataset.

In one or more instances, sub-chambers may receive a portion of an overall instruction from one or more receiver channels. Each receiver channel may load a request instruction, divide the request instruction into various instructions, and send the various instructions to the various sub-chambers. The sub-chambers may then add data to a data element for final delivery to a chamber loader. The loader may send the collected data to the next chamber or for final delivery to the end point. In some instances, the loader itself may be unaware of the data and may act merely as a controller to move the data to the next chamber. Accordingly, each sub-chamber may know that it is contributing to an overall dataset, but might not know what the final dataset would be or when it will be complete. Multiple chambered systems may be deployed across a network to allow a user to engage with one or more vendors. Each vendor's system may store pertinent parts so no one compromise would expose an entire dataset.

Figure 1A:
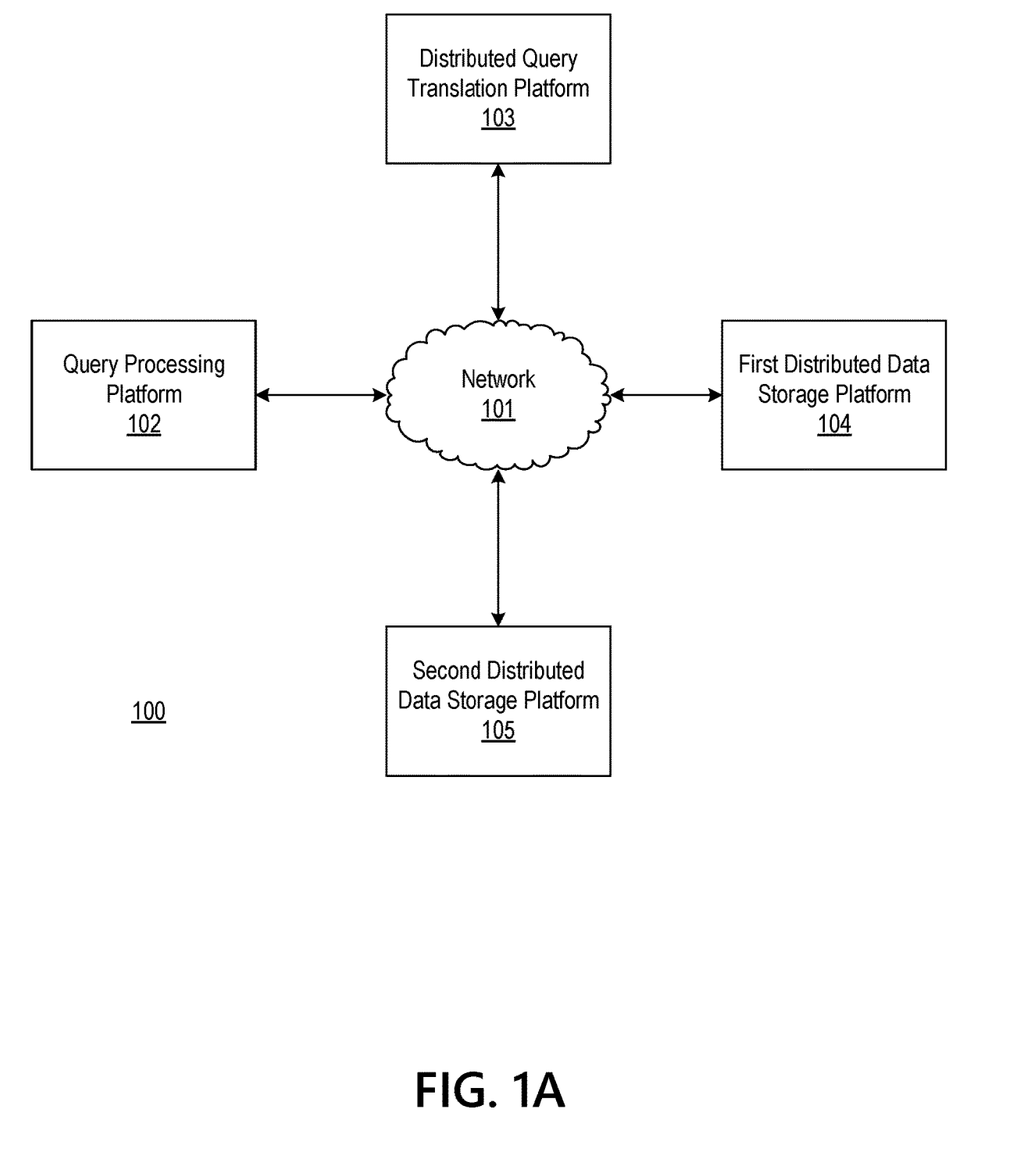
FIGS. 1A-1C depict an illustrative computing environment for deploying an enhanced processing system that performs distributed data storage and query processing in accordance with one or more example embodiments.
Figure 1B:
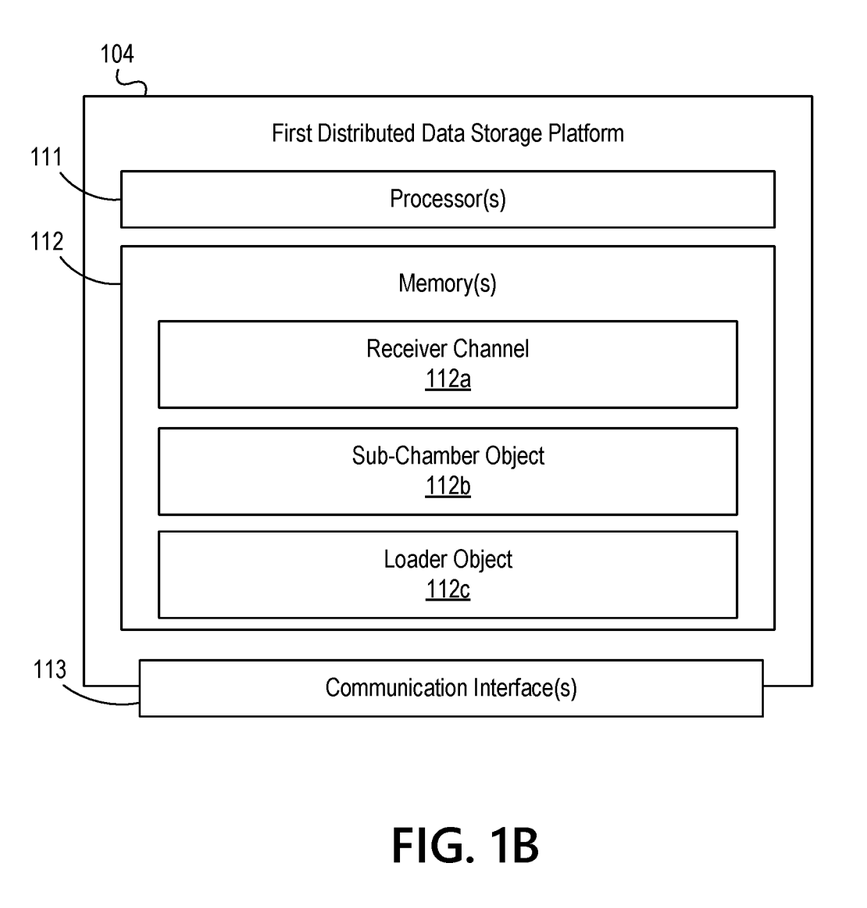
Figure 1C:
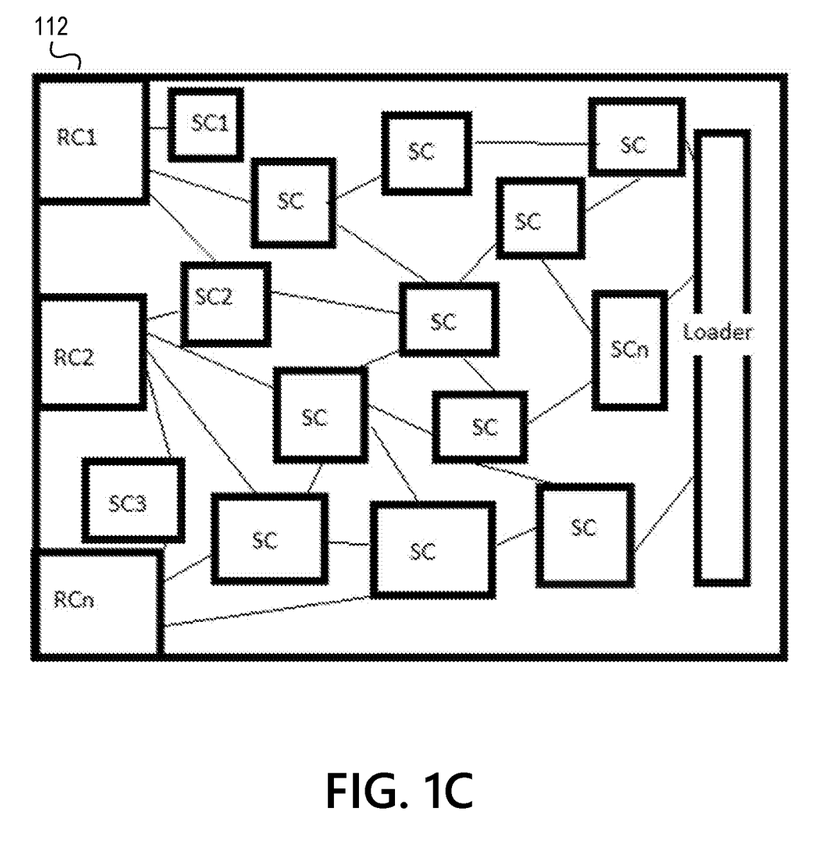

FIGS. 1A-1C depict an illustrative computing environment for deploying an enhanced processing system that performs distributed data storage and query processing in accordance with one or more example embodiments. Referring to FIG. 1A, computing environment 100 may include one or more computer systems. For example, computing environment 100 may include query processing platform 102, distributed query translation platform 103, first distributed data storage platform 104, and second distributed data storage platform 105.

Query processing platform 102 may include one or more computing devices and/or other computer components (e.g., processors, memories, communication interfaces). Query processing platform 102 may cause display of and/or otherwise present one or more graphical user interfaces (e.g., query results provided by one or more distributed data storage platforms). In some instances, the query processing platform 102 may be a desktop computer, a laptop computer, a tablet, a mobile device, or the like. Additionally or alternatively, the query processing platform 102 may be a computer system that includes one or more computing devices (e.g., servers, server blades, or the like) and/or other computer components (e.g., processors, memories, communication interfaces, or the like). In one or more instances, the query processing platform 102 may be configured to receive a query, request data responsive to the query, receive the data, and generate a response to the query accordingly.

Distributed query translation platform 103 may be a computer system that includes one or more computing devices (e.g., servers, server blades, or the like) and/or other computer components (e.g., processors, memories, communication interfaces). In one or more instances, distributed query translation platform 103 may be configured to receive queries formatted in one or more different formats, and may translate the queries into a uniform format readable by the distributed data storage platforms. In these instances, the distributed query translation platform 103 may be configured to forward a translated query to one or more distributed data storage platforms (e.g., first distributed data storage platform 104, second distributed data storage platform 105, or the like).

As described further below, first distributed data storage platform 104 may be a computer system that includes one or more computing devices (e.g., servers, server blades, or the like) and/or other computer components (e.g., processors, memories, communication interfaces) that may be used to store source data. In these instances, the first distributed data storage platform 104 may maintain one or more receiver channels, one or more sub-chambers, and a loader. In some instances, each of the receiver channels, the one or more sub-chambers, and the loader, may be logical objects maintained by the first distributed data storage platform 104. The receiver channels may be configured to receive queries from the distributed query translation platform 103 and route the queries to the one or more sub-chambers. Each of the one or more sub-chambers may be configured to maintain a subset of data that may satisfy the queries, and may be configured to identify such subsets. In these instances, the one or more sub-chambers may also be configured to modify the queries once the corresponding data is identified so that the queries request only an unsatisfied portion of the initial query. The one or more sub-chambers may be configured to send along the identified subset of data and the modified query to one or more additional sub-chambers and/or to the loader, where the dataset may be configured for transmission.

As described above with regard to first distributed data storage platform 104, second distributed data storage platform 105 may be a computer system that includes one or more computing devices (e.g., servers, server blades, or the like) and/or other computer components (e.g., processors, memories, communication interfaces) that may be used to store source data, different than the source data stored at the first distributed data storage platform 104. In these instances, the second distributed data storage platform 105 may maintain one or more receiver channels, one or more sub-chambers, and a loader. In some instances, each of the receiver channels, the one or more sub-chambers, and the loader, may be logical objects maintained by the second distributed data storage platform 105. The receiver channels may be configured to receive queries from the distributed query translation platform 103 and/or one or more other distributed data storage platforms (e.g., first distributed data storage platform 104), and route the queries to the one or more sub-chambers. Each of the one or more sub-chambers may be configured to maintain a subset of data that may satisfy the queries, and may be configured to identify such subsets. In these instances, the one or more sub-chambers may also be configured to modify the queries once the corresponding data is identified so that the queries request only an unsatisfied portion of the initial query. The one or more sub-chambers may be configured to send along the identified subset of data and the modified query to one or more additional sub-chambers and/or to the loader, where the dataset may be configured for transmission.

Computing environment 100 also may include one or more networks, which may interconnect query processing platform 102, distributed query translation platform 103, first distributed data storage platform 104, and second distributed data storage platform 105. For example, computing environment 100 may include a network 101 (which may interconnect, e.g., query processing platform 102, distributed query translation platform 103, first distributed data storage platform 104, and second distributed data storage platform 105).

In one or more arrangements, query processing platform 102, distributed query translation platform 103, first distributed data storage platform 104, and second distributed data storage platform 105 may be any type of computing device capable of receiving a query, storing data responsive to the query, and communicating the stored data to one or more other computing devices in response to the query. For example, query processing platform 102, distributed query translation platform 103, first distributed data storage platform 104, second distributed data storage platform 105, and/or the other systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of query processing platform 102, distributed query translation platform 103, first distributed data storage platform 104, and second distributed data storage platform 105 may, in some instances, be special-purpose computing devices configured to perform specific functions.

Referring to FIG. 1B, first distributed data storage platform 104 may include one or more processors 111, memory 112, and communication interface 113. A data bus may interconnect processor 111, memory 112, and communication interface 113. Communication interface 113 may be a network interface configured to support communication between first distributed data storage platform 104 and one or more networks (e.g., network 101, or the like). Memory 112 may include one or more program modules having instructions that when executed by processor 111 cause first distributed data storage platform 104 to perform one or more functions described herein and/or one or more databases that may store and/or otherwise maintain information which may be used by such program modules and/or processor 111. In some instances, the one or more program modules and/or databases may be stored by and/or maintained in different memory units of first distributed data storage platform 104 and/or by different computing devices that may form and/or otherwise make up first distributed data storage platform 104. For example, memory 112 may have, host, store, and/or include one or more receiver channels 112a, one or more sub-chamber objects 112b, and a loader object 112c. In one or more instances, the one or more receiver channels 112a may enable the first distributed data storage platform 104 to receive queries and to route the queries to appropriate sub-chamber objects (e.g., sub-chamber object 112b). In some instances, the receiver channel 112a may be integrated into the communication interface 113. The one or more sub-chamber objects 112b may each be configured to identify a subset of data that is requested in the received query. In these instances, the one or more sub-chamber objects 112b may be configured to modify the query based on the identified data. The loader object 112c may be configured to assemble the identified data and to send the data along to another distributed data storage platform (e.g., if the query is not satisfied in its entirety) or to the query processing platform 102 (e.g., if the query is satisfied in its entirety). In some instances, the loader object 112c may be integrated into the communication interface 113. An example configuration of the receiver channels 112a, the sub-chamber objects 112b, and the loader objects 112c is depicted in FIG. 1C, which shows a zoomed in view of the memory 112. For example, there may be multiple paths between each of the receiver channels 112a, the sub-chamber objects 112b, and the loader objects 112c, and each of the sub-chamber objects 112b may be configured to identify a different subset of data responsive to the query.

The function and configuration of second distributed data storage platform 105 may be similar to that described above with regard to first distributed data storage platform 104. For example, second distributed data storage platform 105 may include one or more processors, memories, and communication interfaces, and the one or more memories of second distributed data storage platform 105 may include receiver channel(s), sub-chamber object(s), and loader object(s).

Figure 2A:
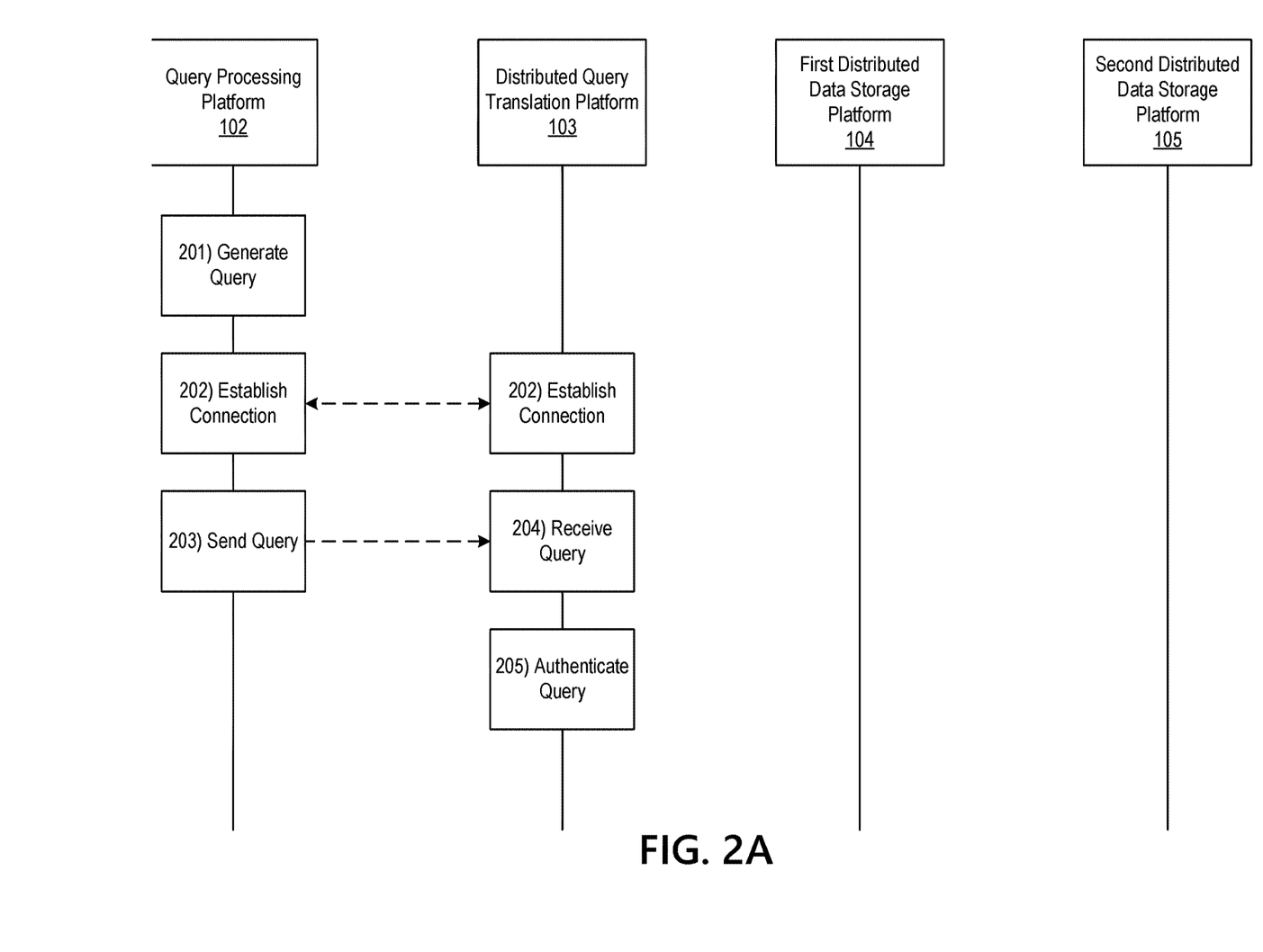
FIGS. 2A-2E depict an illustrative event sequence for deploying an enhanced processing system that performs distributed data storage and query processing in accordance with one or more example embodiments.

FIGS. 2A-2E depict an illustrative event sequence for distributed data storage and query processing in accordance with one or more example embodiments. Referring to FIG. 2A, at step 201, the query processing platform 102 may generate a query (e.g., a Structured Query Language (SQL) query, or the like), requesting a collection of source data. In some instances, the query processing platform 102 may be associated with a particular entity (e.g., a financial institution, or the like) and the query may be formatted in accordance with the query processing platform 102 and/or preferences of the particular entity.

At step 202, the query processing platform 102 may establish a connection with the distributed query translation platform 103. In one or more instances, the query processing platform 102 may establish a first wireless data connection with the distributed query translation platform 103 to link the query processing platform 102 with the distributed query translation platform 103.

At step 203, the query processing platform 102 may send the query to the distributed query translation platform 103. In one or more instances, the query processing platform 102 may send the query to the distributed query translation platform 103 while the first wireless data connection is established.

At step 204, the distributed query translation platform 103 may receive the query sent at step 203. In one or more instances, the distributed query translation platform 103 may receive the query while the first wireless data connection is established.

At step 205, the distributed query translation platform 103 may authenticate the query. In one or more instances, the distributed query translation platform 103 may maintain a known list of malicious queries and/or sources and may compare the query and/or a source of the query to this known list. Additionally or alternatively, the query processing platform 102 and the distributed query translation platform 103 may perform an authentication handshake (e.g., a Diffie-Hellman key exchange, other private/public key exchange, or the like). Additionally or alternatively, the distributed query translation platform 103 may receive an authentication token from the query processing platform 102 and may authenticate the query based on the token.

Figure 2B:
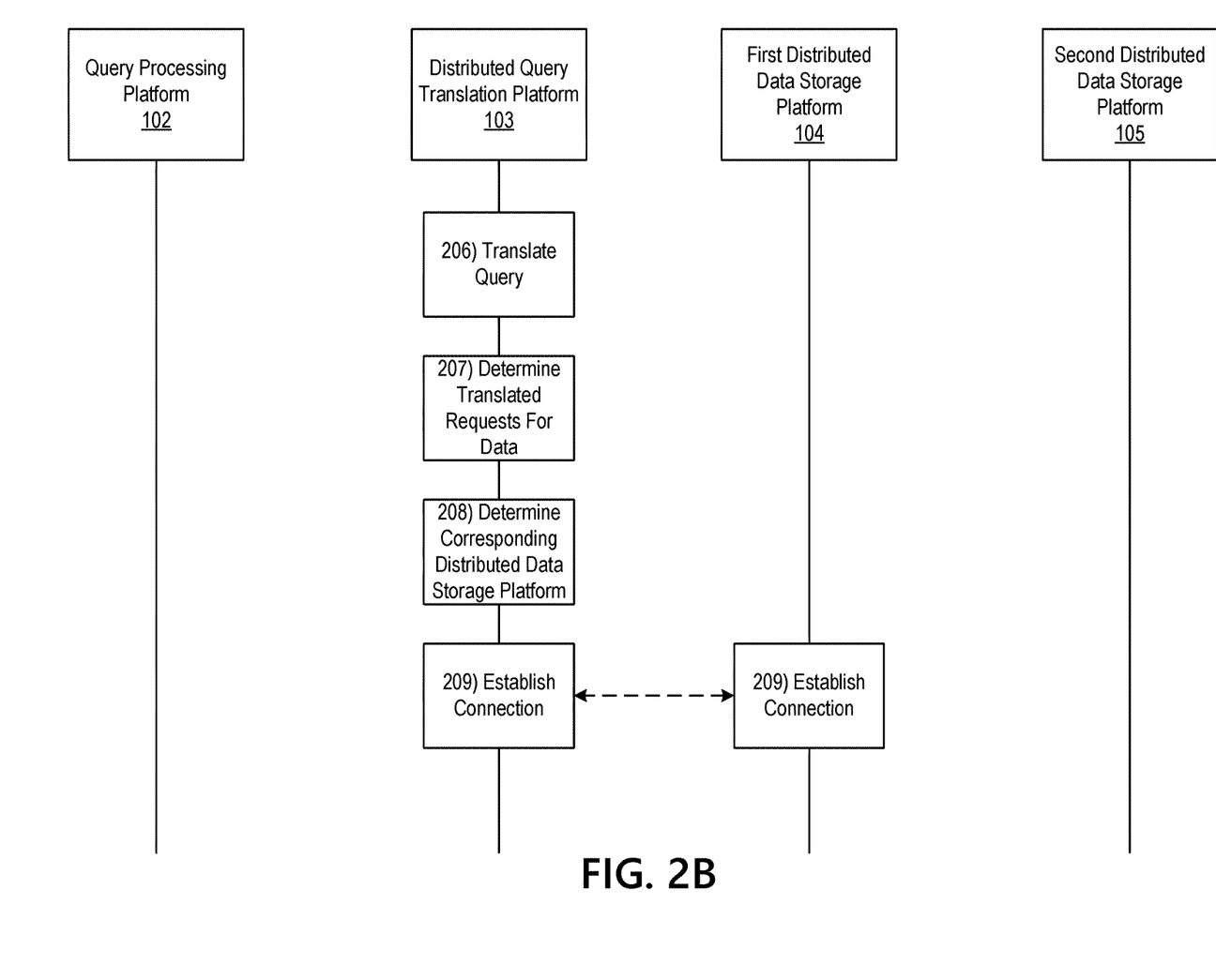

Referring to FIG. 2B, at step 206, after authenticating the query, the distributed query translation platform 103 may translate the query into a format readable by the distributed data storage platforms (e.g., first distributed data storage platform 104 and second distributed data storage platform 105). For example, in some instances, the distributed query translation platform 103 may be configured to receive queries from various query processing platforms (e.g., query processing platform 102, or the like) which may format the queries differently. In one or more instances, the various query processing platforms may each be associated with different entities (e.g., different financial institutions, or the like). In some instances, the various distributed data storage platforms might not be configured to process the queries in the format they are received in by the distributed query translation platform 103, and thus the queries may be translated accordingly. Accordingly, by translating the query, the distributed query translation platform 103 may facilitate storage of a single data collection that may be used to satisfy queries for multiple entities. This may preserve network memory by reducing redundant storage of duplicate data collections.

At step 207, the distributed query translation platform 103 may determine one or more translated requests for source data corresponding to the translated query. For example, the distributed query translation platform 103 may determine that a first portion of the translated query should be processed by a particular distributed data storage platform whereas a second portion of the translated query should be processed by a different distributed data storage platform. In some instances, the distributed query translation platform 103 may make this determination based on the data requested by the query and the data available at each of the distributed data storage platforms. In some instances, the distributed query translation platform 103 may make this determination based on available processing power at the distributed data storage platforms. In yet other instances, the distributed query translation platform 103 may make this determination based on a predetermined preference.

At step 208, the distributed query translation platform 103 may determine a distributed data storage platform corresponding to each translated request for source data. In some instances, the distributed query translation platform 103 may determine which distributed data storage platform the translated requests should be sent to as described above with regard to step 207. In the illustrative example depicted in FIGS. 2A-2E, the distributed query translation platform 103 may determine that the single translated query should be initially processed by the first distributed data storage platform 104.

At step 209, the distributed query translation platform 103 may establish a connection with the first distributed data storage platform 104. In one or more instances, the distributed query translation platform 103 may establish a second wireless data connection with the first distributed data storage platform 104 to link the distributed query translation platform 103 with the first distributed data storage platform 104.

At step 210, the distributed query translation platform 103 may send the translated request for source data to the first distributed data storage platform 104. In one or more instances, the distributed query translation platform 103 may send the translated query to the first distributed data storage platform 104 while the second wireless data connection is established. In some instances, the distributed query translation platform 103 may send multiple translated requests for source data (if multiple were determined at step 207) to different distributed data storage platforms.

Figure 2C:
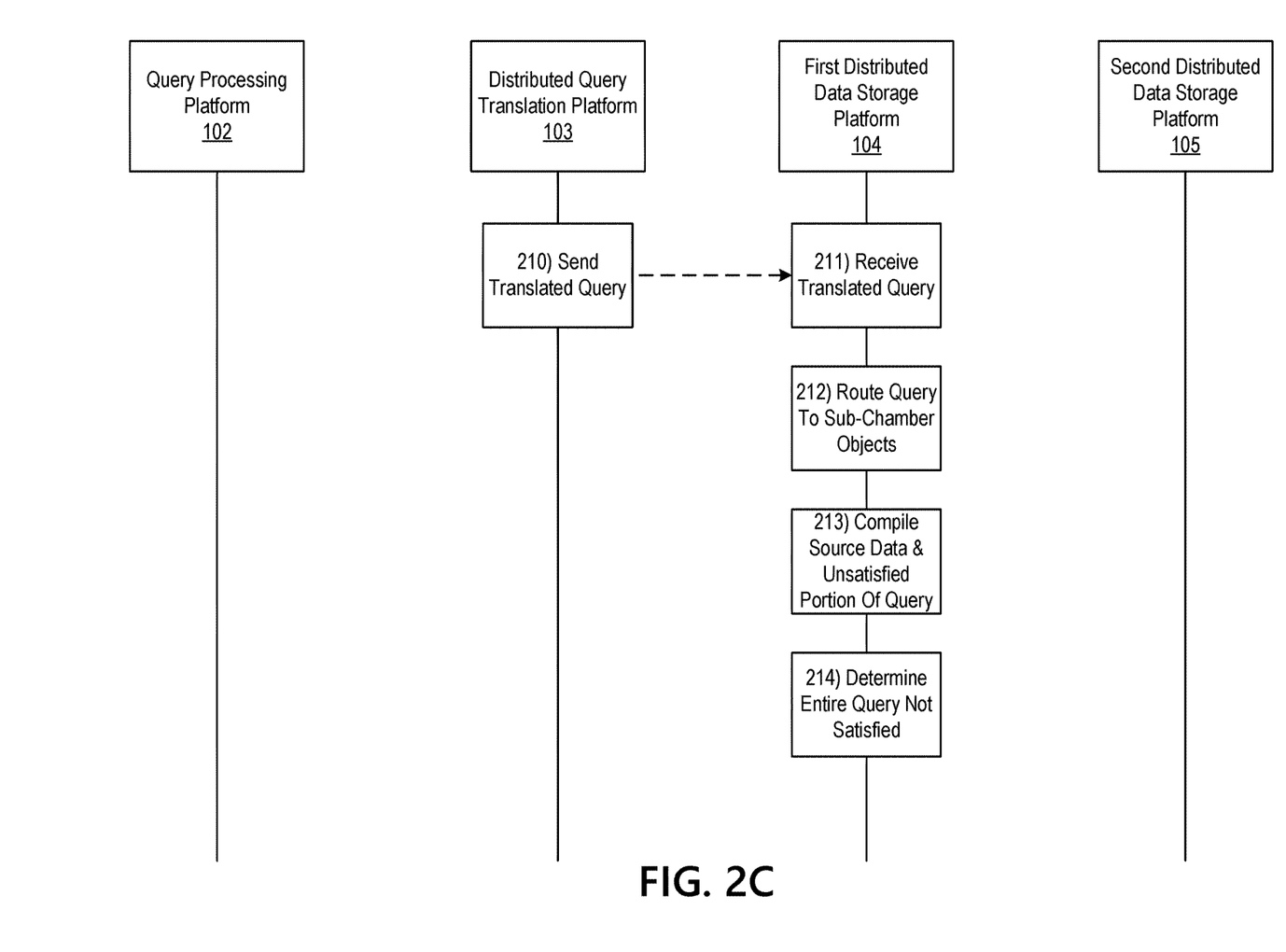

At step 211, the first distributed data storage platform 104 may receive the translated request for source data. In one or more instances, the first distributed data storage platform 104 may receive the translated query while the second wireless data connection is established and at one or more of the receiver channels 112a. In one or more instances, the first distributed data storage platform 104 may authenticate the translated request for source data using similar techniques to those described above with regard to step 205 (e.g., handshake, secure token exchange, or the like). In one or more instances, the first distributed data storage platform 104 may receive the translated request for source data at the receiver channels 112a. In some instances, a different version of the translated request for source data may be received by each of the receiver channels 112a. In one or more instances, the first distributed data storage platform 104 may authenticate the translated request for source data by performing techniques similar to those performed at step 205. This may allow the first distributed data storage platform 104 to act as an individual check on access control and/or enterprise policy.

At step 212, the first distributed data storage platform 104 may route the translated request for source data to one or more sub-chamber objects 112b. For example, the first distributed data storage platform 104 may route the translated request through one or more sub-chamber objects 112b as depicted, for example, in FIG. 1C. In some instances, the path of the translated request through the one or more sub-chamber objects 112b may be unknown to the receiver channels 112a. Each of the sub-chamber objects 112b may be configured to identify a portion of requested source data and to modify the translated request for source data to reflect the identified portion of the requested source data (e.g., so that the request does not continue to prompt for already identified source data). In some instances, the first distributed data storage platform 104 may use the sub-chamber objects 112b to delete, from the request, a satisfied portion of the request. For example, if the translated request for source data comprises a request for first and second portions of the source data, a first sub-chamber object may identify the first portion of the source data and a second sub-chamber object may identify the second portion of the source data. In these instances, after identifying the first portion of the source data, the first sub-chamber object may modify the translated request for source data to reflect the identified first portion of the source data. The first sub-chamber object may then send the first portion of the source data and the modified query to the second sub-chamber object. The second sub-chamber object and the third sub-chamber object may then perform similar actions in turn (e.g., identify a remaining portion of the data, modify the request to reflect the identification, and send the data and the modified request on). As a result, none of the sub-chamber objects will be responsible for storing a dataset responsive to the request in its entirety. Accordingly, this may enhance data security as a breach or infection of a single sub-chamber object may not affect the entire dataset.

In one or more instances, the first distributed data storage platform 104 may determine an error in processing the request at one or more of the sub-chamber objects 112b. In these instances, the first distributed data storage platform 104 might not continue to route the request to additional sub-chamber objects 112b. Rather, the first distributed data storage platform 104 may determine that the request should not be further processed. Accordingly, the first distributed data storage platform 104 may conserve processing resources by avoiding processing an otherwise error-prone request. In other instances, the first distributed data storage platform 104 may route the request to a different sub-chamber object 112b for processing after determining the error.

In one or more instances, each of the logical sub-chamber objects 112b may authenticate the request prior to identifying the corresponding portions of the source data. In these instances, the logical sub-chamber objects 112b may perform similar authentication techniques to those described above with regard to step 205 (e.g., secure token exchanges, handshakes, or the like). In some instances, the logical sub-chamber objects 112b may perform micro-authentication handshakes (e.g., handshakes between each other) to establish authentication. This may allow each of the logical sub-chamber objects 112b to act as an individual check on access control and/or enterprise policy.

In one or more instances, the first distributed data storage platform 104 may continue to route the requests through the various sub-chamber objects 112b until they reach the loader object 112c (e.g., as shown in FIG. 1C). Each distributed data storage platform may have any number of receiver channels 112a and sub-chamber objects 112b.

At step 213, the first distributed data storage platform 104 may compile the source data identified by the sub-chamber objects using the loader object 112c (e.g., into a single data object, spreadsheet, table, or the like). In one or more instances, the first distributed data storage platform 104 may receive source data from a single sub-chamber object. In other instances, the first distributed data storage platform 104 may receive source data from multiple sub-chamber objects (as shown in FIG. 1C).

In one or more instances, the first distributed data storage platform 104 may determine that an error occurred in identification of the source data at one or more of the sub-chamber objects. In these instances, the first distributed data storage platform 104 may generate and send the translated request to another distributed data storage platform along with an indication of the error, and may request that the other distributed data storage platform identify the corresponding source data. In some instances, if the first distributed data storage platform 104 determines that an error occurred, the first distributed data storage platform 104 might not route the query for further processing. In doing so, the first distributed data storage platform 104 may conserve processing resources by avoiding processing of an otherwise error-prone query by additional computing platforms.

In one or more instances, the first distributed data storage platform 104 may compile the identified source data and an unsatisfied portion of the translated request for source data at the loader object 112c.

At step 214, the first distributed data storage platform 104 may determine that the entire query (e.g., the query generated at step 201) has not been satisfied. For example, the first distributed data storage platform 104 may determine that not all of the source data requested in the query has been identified at the first distributed data storage platform 104. In some instances, the first distributed data storage platform 104 may determine instead that the entire query has been satisfied. In these instances, the first distributed data storage platform 104 may assemble the data collection responsive to the query and may send the data collection to the query processing platform 102.

Figure 2D:
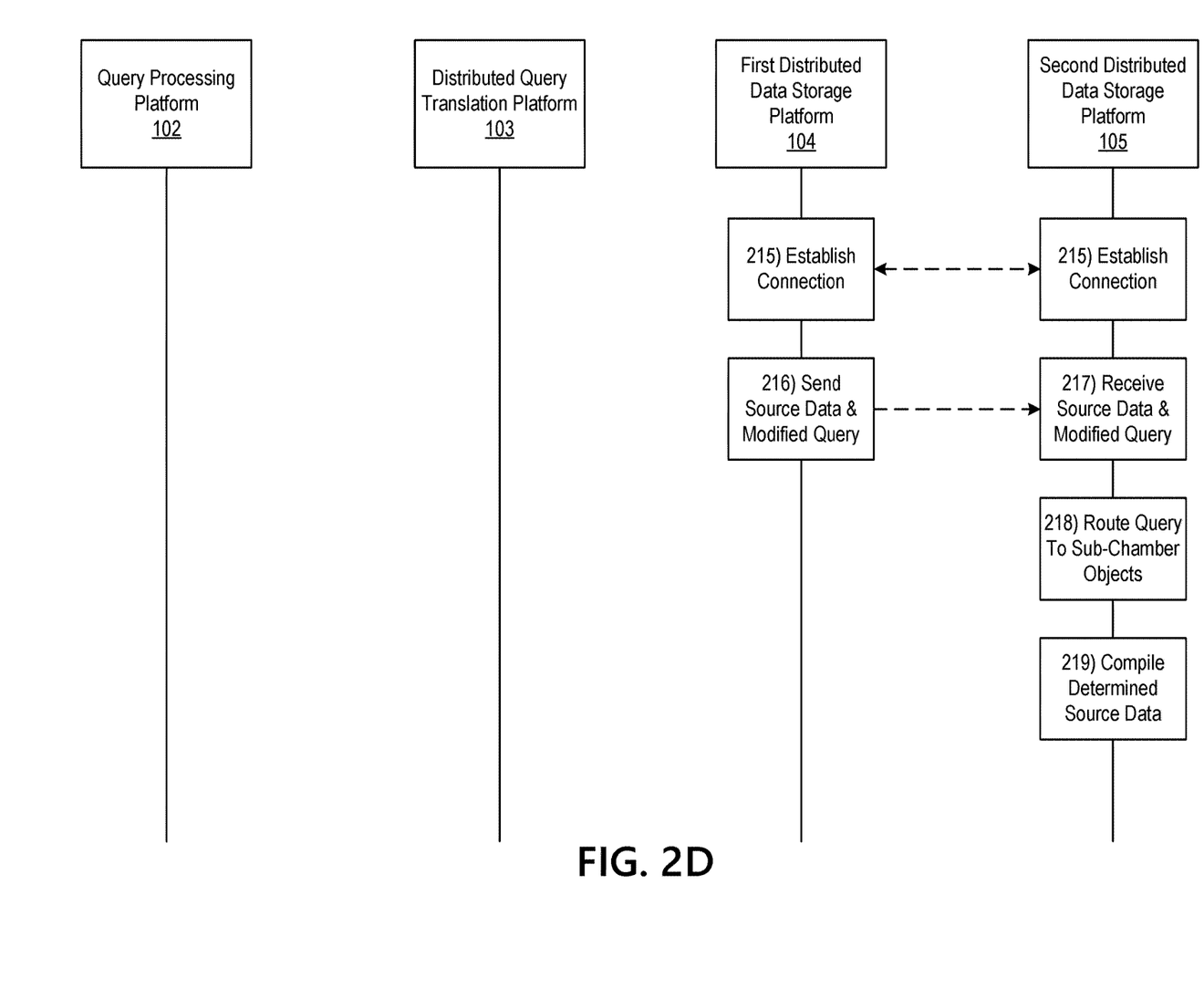

Referring to FIG. 2D, at step 215, the first distributed storage platform 104 may establish a connection with the second distributed data storage platform 105. For example, the first distributed storage platform 104 may establish a third wireless data connection with the second distributed data storage platform 105 to link the first distributed storage platform 104 to the second distributed data storage platform 105.

At step 216, after determining that the entire query has not been satisfied, the first distributed data storage platform 104 may send the source data identified by the first distributed data storage platform 104 and the modified query to the second distributed data storage platform 105. In one or more instances, the first distributed data storage platform 104 may send the source data identified by the first distributed data storage platform 104 and the modified query to the second distributed data storage platform 105 while the third wireless data connection is established and via the loader object. Any of the actions performed by the first distributed data storage platform 104 as described above may be performed by the second distributed data storage platform 105, or any other distributed data storage platform.

At step 217, the second distributed data storage platform 105 may receive the source data and the modified query sent at step 216. In one or more instances, the second distributed data storage platform 105 may receive the source data and the modified query while the third wireless data connection is established at one or more receiver channels of the second distributed data storage platform 105.

At step 218, the second distributed data storage platform 105 may route the modified query from the receiver channels to one or more sub-chamber objects maintained at the second distributed data storage platform 105. Actions performed by the second distributed data storage platform 105 at step 218 may be similar to those performed by the first distributed data storage platform 104 at step 212.

At step 219, once the modified query has been routed through the various sub-chamber objects maintained at the second distributed data storage platform 105, the second distributed data storage platform 105 may compile the determined source data at the loader object maintained by the second distributed data storage platform 105. Actions performed at step 219 by the second distributed data storage platform 105 may be similar to those performed by the first distributed data storage platform 104 at step 213.

Figure 2E:
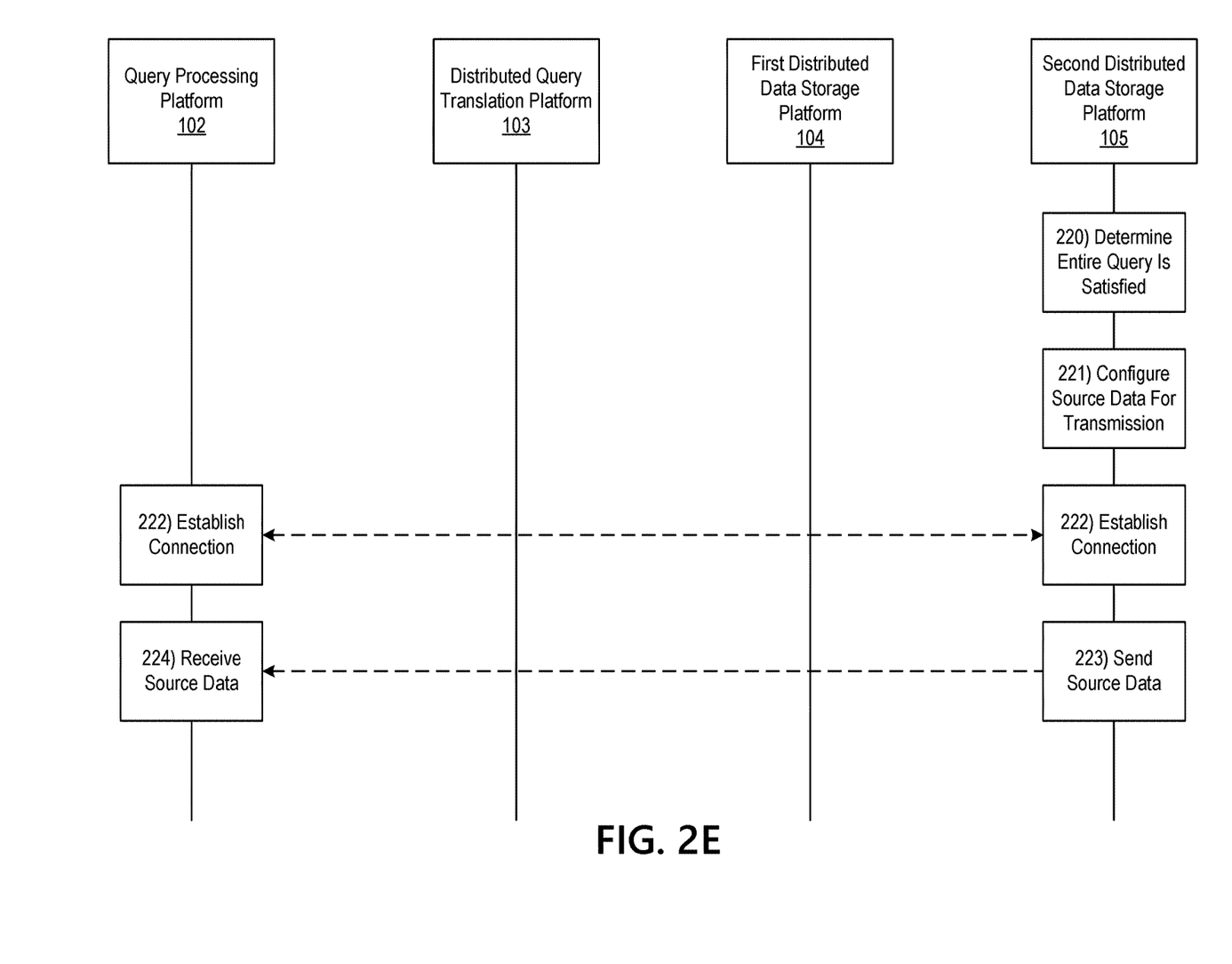

Referring to FIG. 2E, at step 220, the second distributed data storage platform 105 may determine that the entire query (e.g., the query generated at step 201) has been satisfied. For example, the second distributed data storage platform 105 may determine that all of the data requested by the query has been identified by a distributed data storage platform.

At step 221, the second distributed data storage platform 105 may use the loader object to configure the identified source data for transmission to the query processing platform 102. For example, the second distributed data storage platform 105 may assemble the identified source data from the first distributed data storage platform 104 and the second distributed data storage platform 105 into a single data collection.

At step 222, after determining that the entire query has been satisfied, the second distributed data storage platform 105 may establish a connection with the query processing platform 102. For example, the second distributed data storage platform 105 may establish a fourth wireless data connection with the query processing platform 102 to link the second distributed data storage platform 105 to the query processing platform 102.

At step 223, the second distributed data storage platform 105 may send the source data collection to the query processing platform 102. In one or more instances, the second distributed data storage platform 105 may send the source data collection to the query processing platform 102 while the fourth wireless data connection is established.

At step 224, the query processing platform 102 may receive the source data collection sent at step 223. In one or more instances, the query processing platform 102 may receive the source data collection while the fourth wireless data connection is established.

Although a first distributed data storage platform 104 and a second distributed data storage platform 105 are described with regard to the preceding event sequence, any number of distributed data storage platforms may be implemented in the systems and methods described herein. For example, if an unsatisfied portion of the query remains (e.g., additional data is requested that has not yet been identified, the query may be sent to another distributed data storage platform similar to the first distributed data storage platform 104 and/or the second distributed data storage platform 105.

Figure 3:
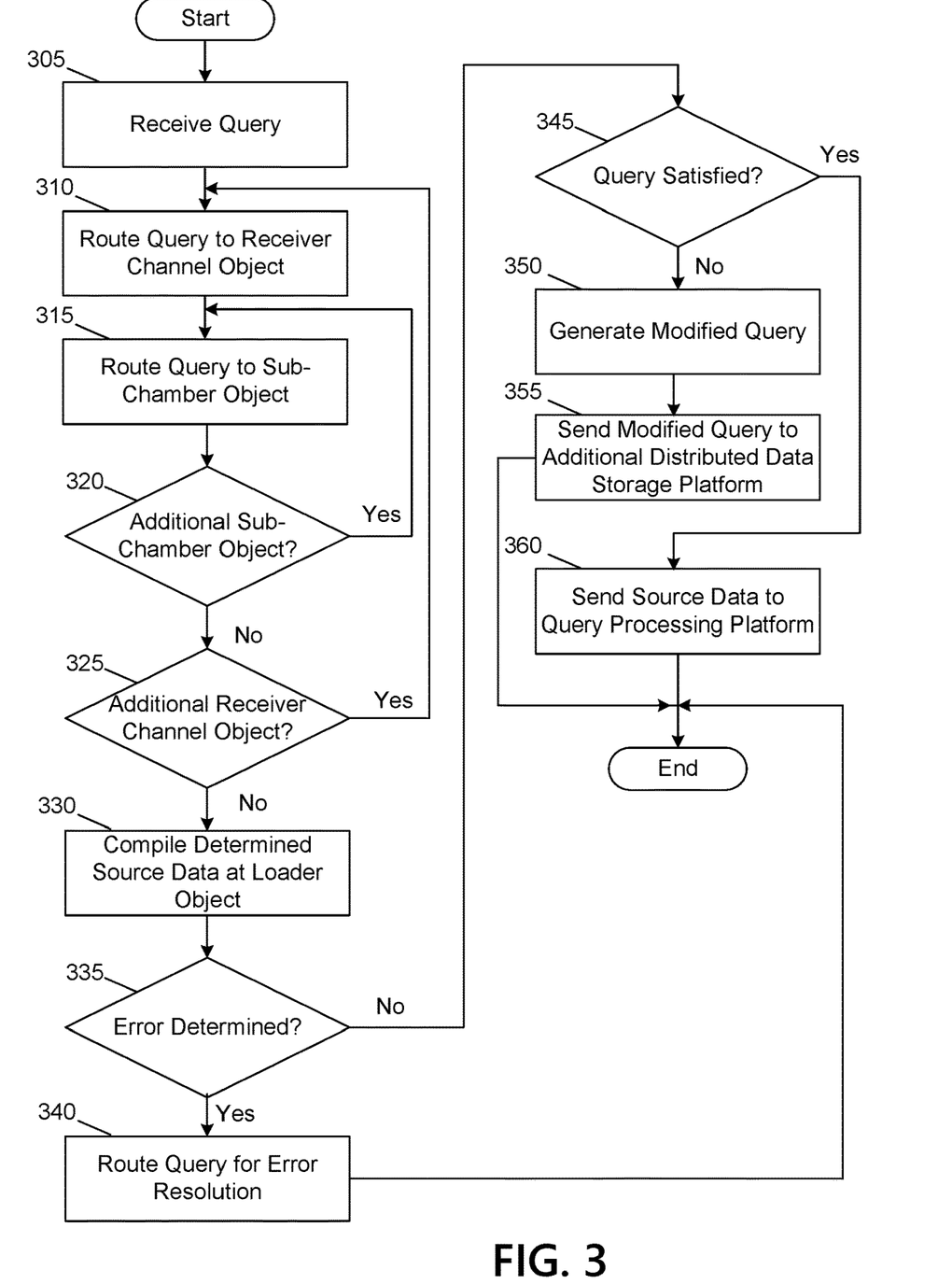
FIG. 3 depicts an illustrative method for deploying an enhanced processing system that performs distributed data storage and query processing in accordance with one or more example embodiments.

FIG. 3 depicts an illustrative method for distributed data storage and query processing in accordance with one or more example embodiments. Referring to FIG. 3, at step 305, a computing platform having at least one processor, a communication interface, and memory may receive a query. At step 310, the computing platform may route a query to one or more receiver channel objects. At step 315, the computing platform may route the query from the receiver channel objects to one or more sub chamber objects, which may each identify a particular subset of data requested in the query. At step 320, the computing platform may determine whether the query should be routed to an additional sub-chamber object. If so, the computing platform may return to step 315. If not, the computing platform may proceed to step 325.

At step 325, the computing platform may determine whether the query should be routed to another receiver channel object. If so, the computing platform may return to step 310. If not, the computing platform may proceed to step 330. At step 330, the computing platform may compile the identified source data at a loader object maintained by the computing platform. At step 335, the computing platform may determine whether an error occurred during compilation of the identified source data. If so, the computing platform may proceed to step 340. If not, the computing platform may proceed to step 345.

At step 340, the computing platform may route the query for error resolution, and subsequently the method may end. At step 345, the computing platform may determine whether the entire query is satisfied. If so, the computing platform may proceed to step 360. If not, the computing platform may proceed to step 350. At step 350, the computing platform may generate a modified query corresponding to an unsatisfied portion of the query. At step 355, the computing platform may send the modified query to an additional distributed data storage platform. Subsequently the method may end. At step 360, the computing platform may send the source data to a query processing platform (which may, e.g., have sent the query at step 305, thereby resolving the query process). By sending this source data to the query processing platform, the process described in FIG. 3 may be completed, and the requested source data may be provided to the query processing platform in a manner that resolves technical problems associated with data protection and security. For example, by maintaining a dataset across multiple sub-chamber objects and data storage platforms, no single sub-chamber object or data storage platform may be responsible for storing a dataset responsive to the request in its entirety. Accordingly, this may enhance data security as a breach or infection of a single sub-chamber object may not affect and/or cause a leak/dissemination of the entire dataset.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform comprising:
   at least one processor;
   a communication interface communicatively coupled to the at least one processor; and memory storing computer-readable instructions that, when executed by the processor, cause the computing platform to:
receive a query comprising a request for a source data collection;
route the query to one or more logical sub-chamber objects, wherein each of the one or more logical sub-chamber objects stores a subset of the source data collection and wherein each logical sub-chamber object is associated with a sub-chamber of a chamber and wherein the sub-chamber of a respective chamber is configured to determine and control actions performed by other chambers;
determine whether an error occurred in processing the query at the one or more logical sub-chamber objects;
responsive to determining that an error occurred in processing the query at the one or more logical sub-chamber objects, route the query to a first additional logical sub-chamber object for processing;
responsive to determining that an error did not occur in processing the query at the one or more logical sub-chamber objects:
identify, at each of the logical sub-chamber objects and in response to the query, a portion of the source data collection maintained by a corresponding logical sub-chamber object;
modify, at each of the logical sub-chamber objects, the query to produce a modified query that requests source data corresponding to an unsatisfied portion of the request;
route, to one or more second, additional logical sub-chamber objects different from the first additional logical sub-chamber object, the modified query and the identified portion of the source data collection until the modified query and the identified portion of the source data collection reach a loader object maintained at the computing platform, wherein each of the one or more second, additional logical sub-chamber objects identify their respective subsets of the source data and modify the modified query to reflect the identification of the respective subsets of the source data;
determine, by the loader object, that the request associated with the source data collection has been satisfied in its entirety;
assemble, by the loader object, a dataset corresponding to the source data collection in its entirety; and
send, in response to the query, the dataset corresponding to the source data collection.

2. The computing platform of claim 1, wherein modifying the query to produce the modified query comprises deleting, from the query, a satisfied portion of the request.

3. The computing platform of claim 1, wherein the memory stores additional computer-readable instructions that, when executed by the at least one processor, further cause the computing platform to:
determine that an error occurred during identification of the portion of the source data collection maintained by the corresponding logical sub-chamber objects; and
determine, based on the error, that the query should not be routed to further logical sub-chamber objects.

4. The computing platform of claim 1, wherein the memory stores additional computer-readable instructions that, when executed by the at least one processor, further cause the computing platform to:
authenticate, prior to routing the query to the one or more logical sub-chamber objects, the query.

5. The computing platform of claim 1, wherein a different version of the query is received at each of a plurality of receiver channel objects maintained by the computing platform.

6. The computing platform of claim 5, wherein a path of the query through the logical sub-chamber objects is unknown to the receiver channel objects.

7. The computing platform of claim 1, wherein the memory stores additional computer-readable instructions that, when executed by the at least one processor, further cause the computing platform to:
in response to determining that the query is not satisfied, route the modified query to an additional computing platform, wherein the additional computing platform is configured to identify a remainder of the source data collection.

8. The computing platform of claim 1, wherein the query is translated into a format readable by the computing platform.

9. A method comprising:
at a computing platform comprising at least one processor, a communication interface, and memory:
receiving, by the at least one processor, a query comprising a request for a source data collection;
routing, by the at least one processor, the query to one or more logical sub-chamber objects, wherein each of the one or more logical sub-chamber objects stores a subset of the source data collection and wherein each logical sub-chamber object is associated with a sub-chamber of a chamber and wherein the sub-chamber of a respective chamber is configured to determine and control actions performed by other chambers;
determining, by the at least one processor, whether an error occurred in processing the query at the one or more logical sub-chamber objects;
responsive to determining that an error occurred in processing the query at the one or more logical sub-chamber objects, routing, by the at least one processor, the query to a first additional logical sub-chamber object for processing;
responsive to determining that an error did not occur in processing the query at the one or more logical sub-chamber objects:
identifying, by the at least one processor, at each of the logical sub-chamber objects and in response to the query, a portion of the source data collection maintained by a corresponding logical sub-chamber object;
modifying, by the at least one processor and at each of the logical sub-chamber objects, the query to produce a modified query that requests source data corresponding to an unsatisfied portion of the request;
routing, by the at least one processor and to one or more second additional logical sub-chamber objects different from the first additional logical sub-chamber object, the modified query and the identified portion of the source data collection until the modified query and the identified portion of the source data collection reach a loader object maintained at the computing platform, wherein each of the one or more second additional logical sub-chamber objects identify their respective subsets of the source data and modify the modified query to reflect the identification of the respective subsets of the source data;

determining, by the at least one processor, that the request associated with the source data collection has been satisfied in its entirety;

assembling, by the at least one processor, a dataset corresponding to the source data collection in its entirety; and sending, by the at least one processor and in response to the query, the dataset corresponding to the source data collection.

10. The method of claim 9, wherein modifying the query to produce the modified query comprises deleting, from the query, a satisfied portion of the request.

11. The method of claim 9, further comprising:
determining, by the at least one processor, that an error occurred during identification of the portion of the source data collection maintained by the corresponding logical sub-chamber objects; and
determining, by the at least one processor and based on the error, that the query should not be routed to further logical sub-chamber objects.

12. The method of claim 9, further comprising:
authenticating, by the at least one processor and prior to routing the query to the one or more logical sub-chamber objects, the query.

13. The method of claim 9, wherein a different version of the query is received at each of a plurality of receiver channel objects maintained by the computing platform.

14. The method of claim 13, wherein a path of the query through the logical sub-chamber objects is unknown to the receiver channel objects.

15. The method of claim 9, further comprising:
in response to determining that the query is not satisfied, routing, by the at least one processor, the modified query to an additional computing platform, wherein the additional computing platform is configured to identify a remainder of the source data collection.

16. The method of claim 9, wherein the query is translated into a format readable by the computing platform.

17. One or more non-transitory computer-readable media storing instructions that, when executed by a computing platform comprising at least one processor, a communication interface, and memory, cause the computing platform to:
receive a query comprising a request for a source data collection;
route the query to one or more logical sub-chamber objects, wherein each of the one or more logical sub-chamber objects stores a subset of the source data collection and wherein each logical sub-chamber object is associated with a sub-chamber of a chamber and wherein the sub-chamber of a respective chamber is configured to determine and control actions performed by other chambers;
determine whether an error occurred in processing the query at the one or more logical sub-chamber objects;
responsive to determining that an error occurred in processing the query at the one or more logical sub-chamber objects, route the query to a first additional logical sub-chamber object for processing;
responsive to determining that an error did not occur in processing the query at the one or more logical sub-chamber objects:
identify, at each of the logical sub-chamber objects and in response to the query, a portion of the source data collection maintained by a corresponding logical sub-chamber object;
modify, at each of the logical sub-chamber objects, the query to produce a modified query that requests source data corresponding to an unsatisfied portion of the request;
route, to one or more second, additional logical sub-chamber objects different from the first additional logical sub-chamber object, the modified query and the identified portion of the source data collection until the modified query and the identified portion of the source data collection reach a loader object maintained at the computing platform, wherein each of the one or more second, additional logical sub-chamber objects identify their respective subsets of the source data and modify the modified query to reflect the identification of the respective subsets of the source data;
determine, by the loader object, that the request associated with the source data collection has been satisfied in its entirety;
assemble, by the loader object, a dataset corresponding to the source data collection in its entirety; and
send, in response to the query, the dataset corresponding to the source data collection.

18. The one or more non-transitory computer-readable media of claim 17, wherein modifying the query to produce the modified query comprises deleting, from the query, a satisfied portion of the request.

19. The one or more non-transitory computer-readable media of claim 17, wherein the memory stores additional instructions that, when executed by the at least one processor, further cause the computing platform to:
determine that an error occurred during identification of the portion of the source data collection maintained by the corresponding logical sub-chamber objects; and
determine, based on the error, that the query should not be routed to further logical sub-chamber objects.

20. The one or more non-transitory computer-readable media of claim 17, wherein the memory stores additional instructions that, when executed by the at least one processor, further cause the computing platform to:
authenticate, prior to routing the query to the one or more logical sub-chamber objects, the query.

* * * * *